(12) United States Patent
Fiola

(10) Patent No.: US 11,304,566 B2
(45) Date of Patent: Apr. 19, 2022

(54) CUTTING BOARD WITH RECESSED TRAY

(71) Applicant: Salvatore Fiola, North Venice, FL (US)

(72) Inventor: Salvatore Fiola, North Venice, FL (US)

( * ) Notice: Subject to any disclaimer, the term of this patent is extended or adjusted under 35 U.S.C. 154(b) by 0 days.

(21) Appl. No.: 16/821,941

(22) Filed: Mar. 17, 2020

(65) Prior Publication Data

US 2020/0315405 A1    Oct. 8, 2020

Related U.S. Application Data

(60) Provisional application No. 62/919,946, filed on Apr. 6, 2019, provisional application No. 62/973,013, filed on Sep. 11, 2019.

(51) Int. Cl.
*A47J 47/00* (2006.01)

(52) U.S. Cl.
CPC .................. *A47J 47/005* (2013.01)

(58) Field of Classification Search
CPC ................................. A47J 47/005
See application file for complete search history.

(56) References Cited

U.S. PATENT DOCUMENTS

| | | | | |
|---|---|---|---|---|
| 1,837,535 A | * | 12/1931 | Duffey | A22C 21/06 452/106 |
| 5,527,022 A | * | 6/1996 | Gibson | A47J 47/005 269/13 |
| D390,072 S | * | 2/1998 | Miller | D7/698 |
| 2009/0045277 A1 | * | 2/2009 | Shamoon | A47J 47/005 241/274 |
| 2013/0214466 A1 | * | 8/2013 | Young | A47J 47/005 269/14 |
| 2014/0265088 A1 | * | 9/2014 | Arvan | A47J 47/005 269/14 |

* cited by examiner

*Primary Examiner* — Nirvana Deonauth
(74) *Attorney, Agent, or Firm* — Justin Luby

(57) ABSTRACT

The present invention relates to a cutting board of the present invention with an integral, recessed tray, to hold the cut-up pieces of vegetables or fruits from rolling or sliding off the edges of the cutting board and sloped walls to facilitate the cut-up pieces of fruits and vegetables easily sliding out of the recessed tray when transferring them, recessed drain channels, which catch juices and liquids, and drain them into the recessed tray, and a recessed drain spout in each of the two outside corners of the recessed tray, to allow the liquids in the tray to be easily drained out of the tray, without any spills or mess.

2 Claims, 3 Drawing Sheets

CUTTING BOARD WITH RECESSED TRAY

CROSS-REFERENCE TO RELATED APPLICATIONS

This application claims priority to provisional applications U.S. Ser. No. 62/919,946 filed Apr. 6, 2019 and U.S. Ser. No. 62/973,013 filed Sep. 11, 2019.

FIELD OF THE INVENTION

The disclosure of the present patent application generally relates to food preparation, and particularly to cutting boards.

BACKGROUND

Cutting boards are used as a surface on which to prepare various types of foods including fruits, vegetables, meats, fish, etc. A cutting board provides a flat work surface to slice, dice, chop, pare, and otherwise process foods to their desired size, shape and/or consistency. A cutting board protects the countertop or other surface on which it is placed from damage during this processing. However, during the preparation of food on a cutting board chopped foods and/or liquids and juices from the cut and chopped foods may spill over the edge of the cutting board.

Following the act of cutting and chopping the foods, the mobility of the cutting board is useful to transport the cut food to the pan, serving platter, et al, for the next step of processing or consuming the chopped foods.

The mobility of a cutting board also helps with the disposal of wastes. Food wastes that are not further processed or consumed that collect on a cutting board are disposed of by carrying the waste-containing cutting board to a waste bin and dumping the waste.

There have been several advancements in the art of cutting board, which help retain cut and or chopped foods and liquids on the cutting board. Design Pat. D390,072 discloses a cutting board that has a recessed tray. While the recessed tray on this invention will help retain cut and chopped foods when directed into the recessed tray by the user, the device will not prevent chopped foods and/or liquids and juices from the cut and chopped foods from accidentally spilling over the edge of the cutting board, and making a mess when the user attempts to transfer the materials out of the tray.

Other advancements in cutting boards include inventions that include raised cutting surfaces and have drawers or compartments underneath to catch cut-up pieces. However, all these other designs are big, bulky, costly, cumbersome, and involve separate drawers or compartments.

U.S. Pat. No. 9,839,328 discloses a cutting board that has a recessed tray with an open corner for directing chopped foods from the recessed tray, however the open corner extends to the bottom of the recessed tray, therefore, would not retain liquids in the recessed tray. Furthermore, the walls of the recessed tray are vertical, making it difficult to transfer chopped foods out of the tray.

U.S. Pat. No. 9,687,113 discloses a cutting board assembly that includes a cutting board and a reservoir area for liquids, one or more channels to help direct the liquid to the reservoir, and one or more pouring spouts through which the liquid in the reservoir area may be poured therefrom. However, the reservoir for this invention only collects liquids, and not the cut or chopped foods, and the spouts cannot be used to direct chopped foods into a pan, serving platter, etc. Furthermore, the walls of the recessed tray are vertical, making it difficult to transfer chopped foods out of the tray.

Still further advancements in cutting boards incorporate raised edges along the top of the cutting board to prevent cut items from sliding off the cutting board, essentially making the entire cutting board into a recessed tray. These types of cutting boards can provide challenges during use, as the raised edges of the cutting board get in the way of the knife. U.S. Pat. Nos. 8,141,860; 7,878,493; and 4,447,051 are examples of these cutting boards with raised edges.

Therefore, it is the object of the present invention to provide a single cutting apparatus capable of allowing food items to be chopped on a cutting surface, transferred to a storage area, and then easily dispensed from the storage area into separate receptacles for either further processing, cooking, serving, or disposal.

SUMMARY

In a preferred embodiment of the present invention provides for a cutting board that allows one to chop or slice vegetables and fruits, and a means to prevent the cut-up pieces from rolling or sliding off the cutting board, especially as one transfers the cut-up pieces to a cooking pot or bowl. Further, the present invention makes it possible to lift the cutting board with only one hand. In addition, the present invention can be used to cut meats or other items that contain juices and liquids, because the recessed drain channels guide these liquids into the recessed tray, and the drain spouts in the corners of the tray can be used to empty liquids out of the tray without spills.

The cutting board of the present invention has an integral, recessed, "holding" tray to hold the cut-up pieces of vegetables or fruits from rolling or sliding off the edges of the cutting board. The walls of the tray are sloped, and the corners are rounded to allow easy transfer and cleanability. The recessed holding tray is especially useful when chopping or slicing "rounded" items, like carrots, asparagus, celery, zucchini, cucumbers, bananas, etc., but it is also very helpful no matter what items are being sliced.

The cutting board of the present invention additionally includes recessed drain channels, which catch juices and liquids, and drain them into the recessed tray. Furthermore, the cutting board of the present invention additionally provides a recessed drain spout in each of the two outside corners of the recessed tray, to allow the liquids in the tray to be easily drained out of the tray, without any spills or mess.

DETAILED DESCRIPTION OF THE INVENTION AND PREFERRED EMBODIMENT

Figure 1:
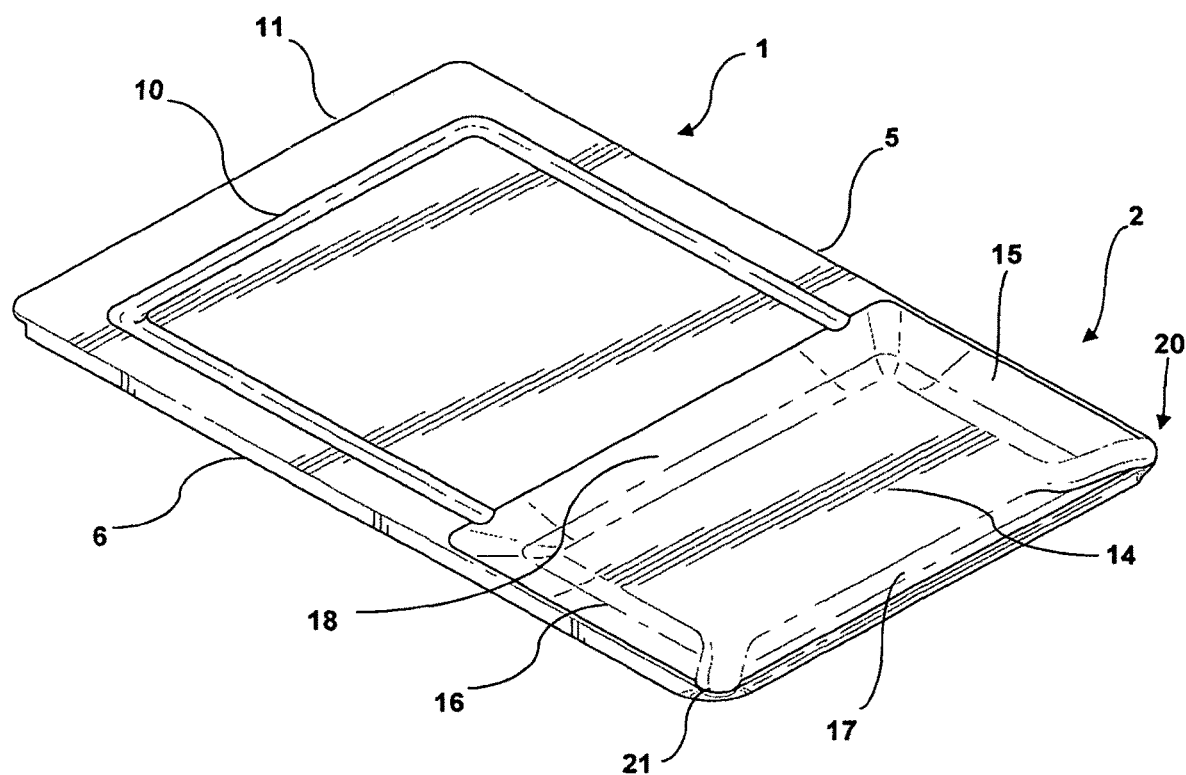
FIG. 1 is a perspective view of the cutting board of the current invention.
Figure 2:
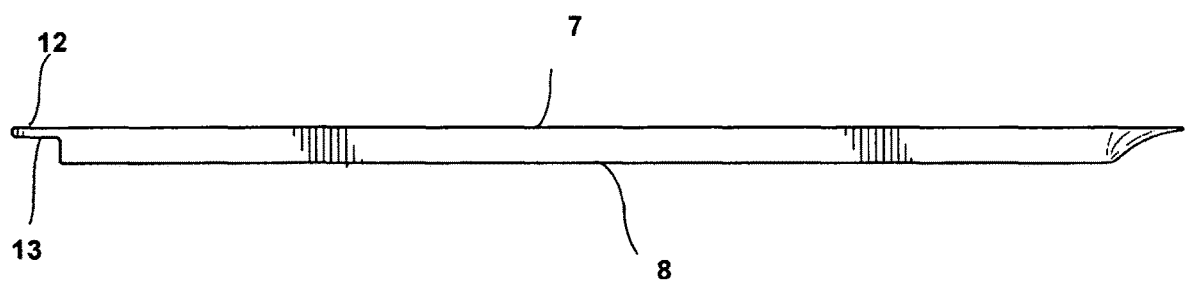
FIG. 2 is a side view thereof.
Figure 3:
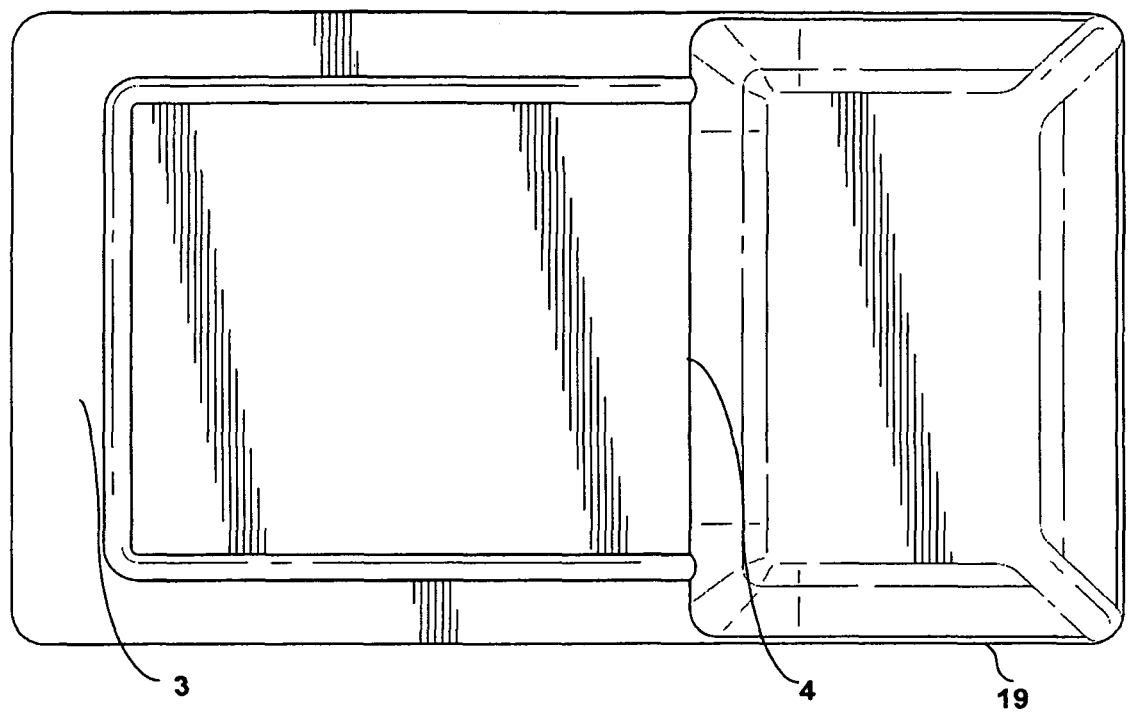
FIG. 3 is a top view thereof.
Figure 4:
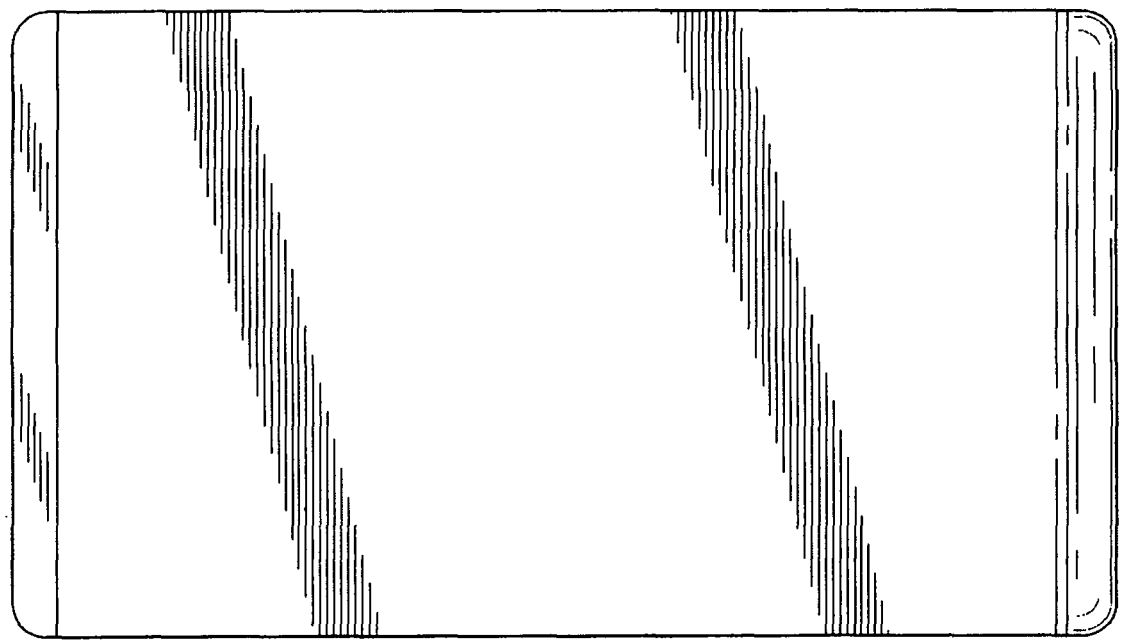
FIG. 4 is a bottom view thereof.

With reference to the FIGS. 1-4, the cutting board of the present invention is comprised a cutting surface 1 and a recessed tray 2.

The cutting surface of the cutting board is generally rectangular with two ends 3,4, two sides 5,6, a top 7, and a bottom 8. The ends 3,4 are generally parallel to each other, the sides 5,6 are generally parallel to each other, and the ends 3,4 and sides 5,6 are generally perpendicular to each other. Connected to one of the ends 3, is a protruding lip 11, and connected to the other end 4, is the recessed tray 2.

Running along one of the ends 3, and the two sides 5,6, and feeding into the recessed tray 2 is a channel 10. The channel 10 has a semi-circular or vee-shaped profile and is either vertically parallel with the cutting surface 1, or slightly sloped downward from the protruding lip end 3, to tray end 4. The channel 10 serves to capture liquids from the cutting surface 1, before the liquids spill off the protruding lip end 3 or sides 5,6 of the top 7 of cutting board.

A protruding lip 11 runs along one end 3 of the cutting surface and has a top 12 and a bottom 13. In the preferred embodiment, the protruding lip bottom 13 is vertically spaced above the bottom 8 of the cutting surface 2 and the protruding lip top 12 is level with the cutting board surface 2. The protruding lip 11 makes it possible to lift the cutting board with only one hand by simply placing one or two fingers under the protruding lip 11 and lift, and then you are able to slide all the fingers of your hand under the bottom side 8 of the cutting surface 1, and thereby lift the cutting board with only one hand. However, one skilled in the art could affix the protruding lip 11 to the end 3 of the cutting board at a number of orientations to achieve a similar effect.

The recessed tray 2 is connected to one end of the cutting surface 4 and has a bottom surface 14, opposed side surfaces 15 and 16 a front surface 17 and a rear surface 18 that connects to the cutting surface 4. A top edge 19 extends about the upper portion of sides 15 and 16, front 17 and rear 18. The sides of recessed tray 15, 16, 17, 18 have angled, beveled edges, so that when the cutting board is lifted and slanted on its side, the cut-up pieces slide out of the tray effortlessly, with no fuss or mess or spills. The recessed tray 2 facilitates the convenient transfer of cut food materials from cutting surface 1 to the recessed tray 2. Cut food articles upon cutting surface 1 are simply swept over the edge 4 to fall into the recessed tray 2.

The sides 15, 16, 17, 18 of the recessed tray 2, as well as the corners between the sides 15, 16, 17, 18 of the tray and the bottom surface 14 of the tray, are all rounded, and sloped, and not vertical. These sloped sides 15, 16, 17, 18 and corners allow cut-up fruits and vegetables that are in the tray 2 to easily slide out of the tray 2, and into a pot or bowl, simply by lifting and slanting the cutting board on its side. Additionally, these sloped and rounded edges are more hygienic, because they are easier to clean.

In the preferred embodiment the recessed tray 2 also incorporates drain spouts 20, in each of the two outside corners of the recessed tray 2, to allow the finely chopped foods and liquids in the recessed tray 2 to be easily drained out of the tray 2, without any spills or mess. The corner wall of the recessed tray 2 under each drain spout is slightly indented in, so the rim of the spout 21 can extend slightly out, but still not extend beyond the top edge 19 of the recessed tray 2. These spouts 20 allows finely chopped foods and liquids to be drained out of the tray 2 with no spills.

In the preferred embodiment, the components of cutting assembly, are formed with rigid materials. Examples of rigid materials include wood, bamboo, plastics such as acrylonitrile-butadiene-styrene (ABS), polyethylene, thermoplastic polyurethane (TPU), polypropylene and the like.

Figure 5:
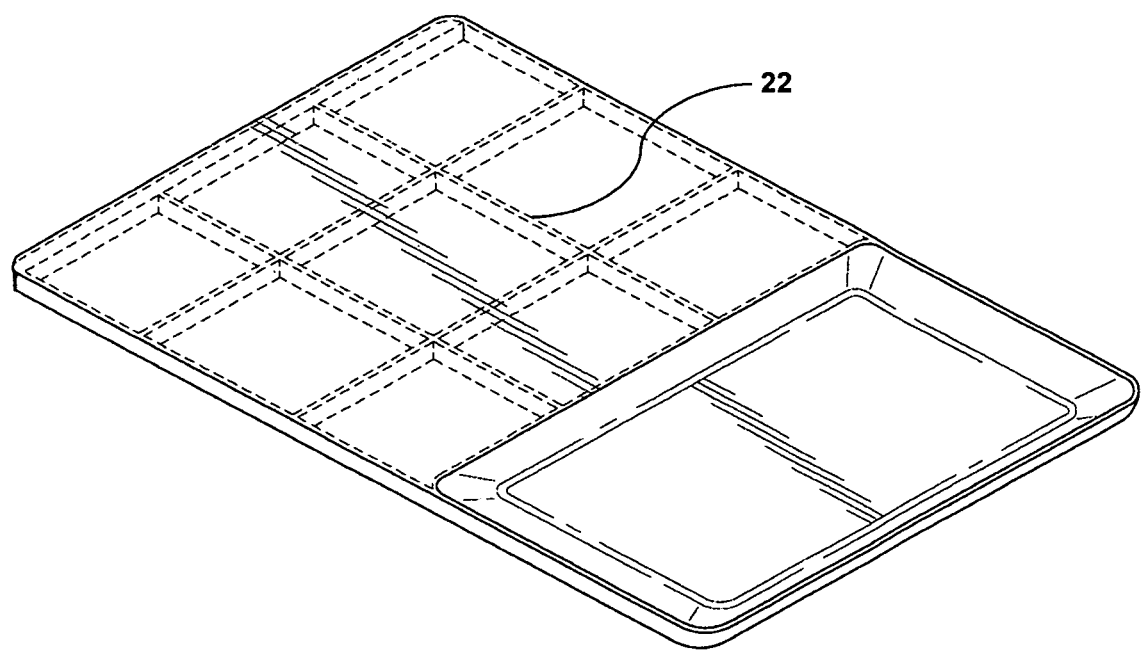
FIG. 5 is a perspective view of a first alternate embodiment of the cutting board of the current invention.

FIG. 5 refers to a first alternate embodiment of the current invention, wherein the cutting surface 1 of the cutting board hollowed-out on the bottom and supported by reinforcing ribs 22. The reinforcing ribs 22 extend downward from the cutting surface to the bottom of the recessed tray 2 and traverse the cutting board between the two ends 3,4 and between the two sides 5,6. This embodiment allows one to use less material, and thus save on cost. While not depicted in FIG. 5, this alternate embodiment could also optionally incorporate the channel 10, protruding lip 11, and/or drain spouts 20 included in the preferred embodiment.

Figure 6:
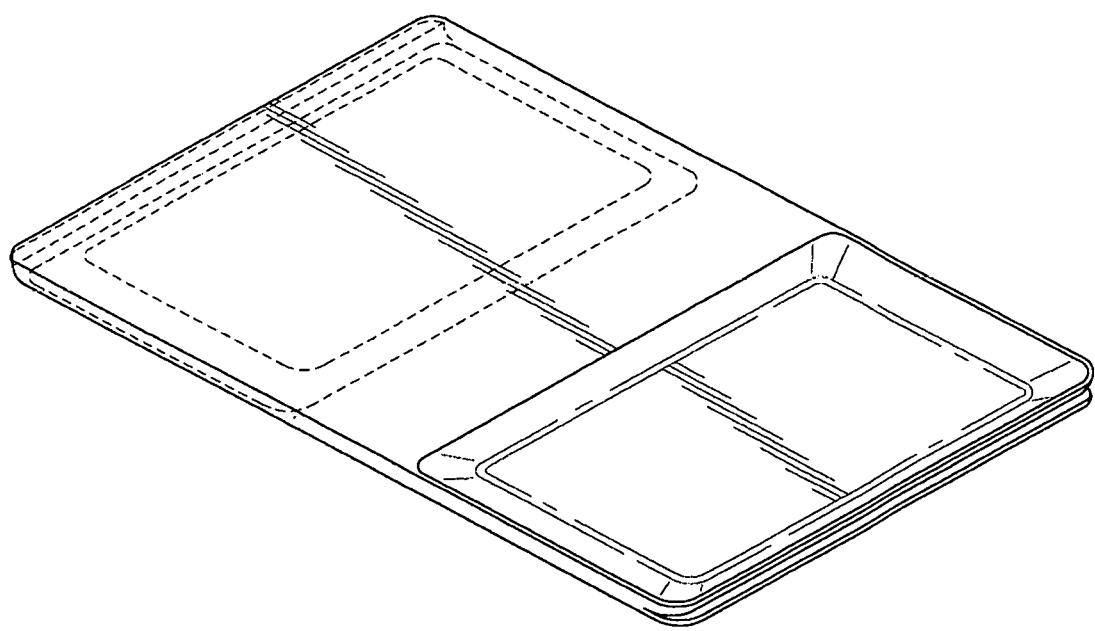
FIG. 6 is a perspective view of a second alternate embodiment of the cutting board of the current invention.

FIG. 6 refers to a second alternate "reversible" embodiment of the current invention. This embodiment has a recessed tray 2 on both the top side 7 and bottom side 8 of the cutting board, but on opposite sides. This embodiment allows one to use both sides of the cutting board, reducing the frequency of cleaning required. Both ends of the cutting board also have the protruding lip 11, that enables one to lift the cutting board with only one hand. While not depicted in FIG. 6, this alternate embodiment could also optionally incorporate the channel 10, protruding lip 11, and/or drain spouts 20 included in the preferred embodiment.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A cutting board apparatus for cutting food comprising:
   a cutting surface where food is cut up, with first and second ends, first and second sides, a bottom, and a top with a channel that runs along the first and second sides and the first end, the channel that runs along the first and second sides terminate at a recessed tray located at the second end and configured to drain liquids into the recessed tray;
   a protruding lip located at the first end and the top of the cutting surface; the protruding lip extending along the first end continuously between a first end of the first side and a first end of the second side; the protruding lip projecting outwardly from a first end of the bottom of the cutting surface in a longitudinal direction of the cutting board and configured for lifting the cutting board;
   wherein, cut up food is transferred from the cutting surface into the recessed tray, the recessed tray comprising a bottom surface, first and second side sloped surfaces, a front sloped surface, a rear sloped surface located at the second end of the cutting surface, and a top edge extending about an upper portion of the first and second side sloped surfaces, the front sloped surface and the rear sloped surface; wherein the bottom surface of the recessed tray is coplanar with the bottom of the cutting surface; wherein said recessed tray further comprises at least one recessed sloped drain spout located where the first side sloped surface connects to the front sloped surface or where the second side sloped surface connects to the front sloped surface;

whereby the first and second side sloped surfaces and the front sloped surface angle upward from the bottom surface of the recessed tray at an angle that enables the cut up food to slide out of the recessed tray when the cutting board apparatus is lifted and slanted.

2. The cutting board apparatus of claim 1, wherein said at least one recessed sloped drain spout include two recessed drain sprouts.

* * * * *